United States Patent
Jaradi et al.

(10) Patent No.: US 9,327,669 B2
(45) Date of Patent: May 3, 2016

(54) WRAP-AROUND CURTAIN FOR A VEHICLE

(71) Applicant: Ford Global Technologies, LLC, Dearborn, MI (US)

(72) Inventors: Dean M. Jaradi, Macomb, MI (US); Mohammed Omar Faruque, Ann Arbor, MI (US); Robert William McCoy, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/319,072

(22) Filed: Jun. 30, 2014

(65) Prior Publication Data

US 2015/0375704 A1    Dec. 31, 2015

(51) Int. Cl.
*B60R 21/08*  (2006.01)
*B60R 21/00*  (2006.01)

(52) U.S. Cl.
CPC ......... *B60R 21/08* (2013.01); *B60R 2021/0009* (2013.01); *B60R 2021/0048* (2013.01); *B60R 2021/0058* (2013.01)

(58) Field of Classification Search
CPC ............ B60R 21/2232; B60R 21/2338; B60R 2021/23382; B60R 2021/23386; B60R 21/06; B60R 21/08
USPC ............................................... 280/730.2, 749
See application file for complete search history.

(56) References Cited

U.S. PATENT DOCUMENTS

| | | | | |
|---|---|---|---|---|
| 3,037,809 A * | 6/1962 | Praha | ...................... | B60R 21/08 280/749 |
| 3,650,542 A * | 3/1972 | Shimano | ................. | B60R 21/08 280/749 |
| 5,232,244 A * | 8/1993 | Itoh | ......................... | B60R 21/08 160/275 |
| 5,462,308 A * | 10/1995 | Seki | ........................ | B60R 21/08 280/730.2 |
| 5,660,414 A * | 8/1997 | Karlow | ................... | B60R 21/08 180/274 |
| 5,707,075 A * | 1/1998 | Kraft | ................. | B60R 21/23138 280/730.2 |
| 6,095,551 A | 8/2000 | O'Docherty | | |
| 6,135,497 A * | 10/2000 | Sutherland et al. | ............ | 280/749 |
| 6,237,938 B1 * | 5/2001 | Boxey | ................... | B60R 21/232 280/730.2 |
| 6,237,943 B1 * | 5/2001 | Brown | .................. | B60R 21/213 280/728.2 |
| 6,672,619 B1 * | 1/2004 | Ennerdal | ................. | B60R 21/08 280/748 |
| 7,322,606 B2 * | 1/2008 | Yamamura | ............. | B60J 1/2025 280/730.2 |
| 7,416,211 B2 * | 8/2008 | Bannon | ............... | B60R 21/0134 280/749 |
| 7,556,291 B2 * | 7/2009 | Gale | ........................ | B60J 5/065 280/749 |
| 7,762,579 B2 * | 7/2010 | Garner | ....................... | 280/730.2 |

(Continued)

FOREIGN PATENT DOCUMENTS

DE           10328977 A1 *  1/2005
DE       102013015340 A1 *  5/2014

(Continued)

*Primary Examiner* — Ruth Ilan
(74) *Attorney, Agent, or Firm* — Frank A. MacKenzie; Bejin Bieneman PLC

(57) ABSTRACT

A vehicle curtain system comprises a curtain having at least a front wall and two side walls, at least one pretensioner having a corresponding pretensioner cable, and a plurality of tethers, each having a first end attached to the curtain.

19 Claims, 4 Drawing Sheets

(56) References Cited

U.S. PATENT DOCUMENTS

| | | | |
|---|---|---|---|
| 8,562,018 B1 * | 10/2013 | Wantin | 280/730.2 |
| 8,596,673 B2 * | 12/2013 | Ruedisueli et al. | 280/730.2 |
| 2003/0127842 A1 * | 7/2003 | Pywell | B60R 21/08 280/753 |
| 2003/0230876 A1 * | 12/2003 | Ohrvall et al. | 280/730.2 |
| 2005/0023806 A1 * | 2/2005 | Higuchi | B60R 21/231 280/730.1 |
| 2005/0082797 A1 * | 4/2005 | Welford et al. | 280/730.2 |
| 2006/0066079 A1 * | 3/2006 | Inoue et al. | 280/730.2 |
| 2006/0097491 A1 | 5/2006 | Saberan et al. | |
| 2006/0175814 A1 * | 8/2006 | Jang | B60R 21/08 280/730.2 |
| 2007/0005207 A1 * | 1/2007 | Foo et al. | 701/45 |
| 2008/0106084 A1 * | 5/2008 | Mitchell et al. | 280/743.2 |
| 2009/0058054 A1 * | 3/2009 | Nelson et al. | 280/730.2 |

FOREIGN PATENT DOCUMENTS

| | | | |
|---|---|---|---|
| GB | 2351710 A * | 1/2001 | |
| JP | 2004-224327 A * | 8/2004 | |
| JP | 10119699 | 5/2010 | |
| WO | WO 95 12504 A1 * | 5/1995 | |
| WO | WO 95 21753 A1 * | 8/1995 | |

* cited by examiner

WRAP-AROUND CURTAIN FOR A VEHICLE

BACKGROUND

Oblique impacts cause particular risks for vehicle occupants. An oblique impact is one in which a vehicle strikes another object at an angle, e.g., at an angle of a longitudinal axis of the vehicle with respect to the object, e.g., the angle being approximately 15 degrees. When an oblique impact occurs at a front of a vehicle, a vehicle occupant may move at an angle with respect to the longitudinal axis of the vehicle. That is, when an oblique impact occurs, the vehicle occupant may be moved in a direction determined by the angle of impact, i.e., the occupant or at least the occupant's head and/or upper body, may be moved in a direction at the angle to the longitudinal axis of the vehicle of the oblique impact. Accordingly, new vehicle safety mechanisms are needed that protect an occupant in the case of an oblique impact. For example, a driver-side or passenger-side front airbag, even in combination with a side-curtain airbag or other airbag, may not protect an occupant's head from striking or going through a vehicle window in the case of an oblique impact.

DRAWINGS

DETAILED DESCRIPTION

Figure 1:
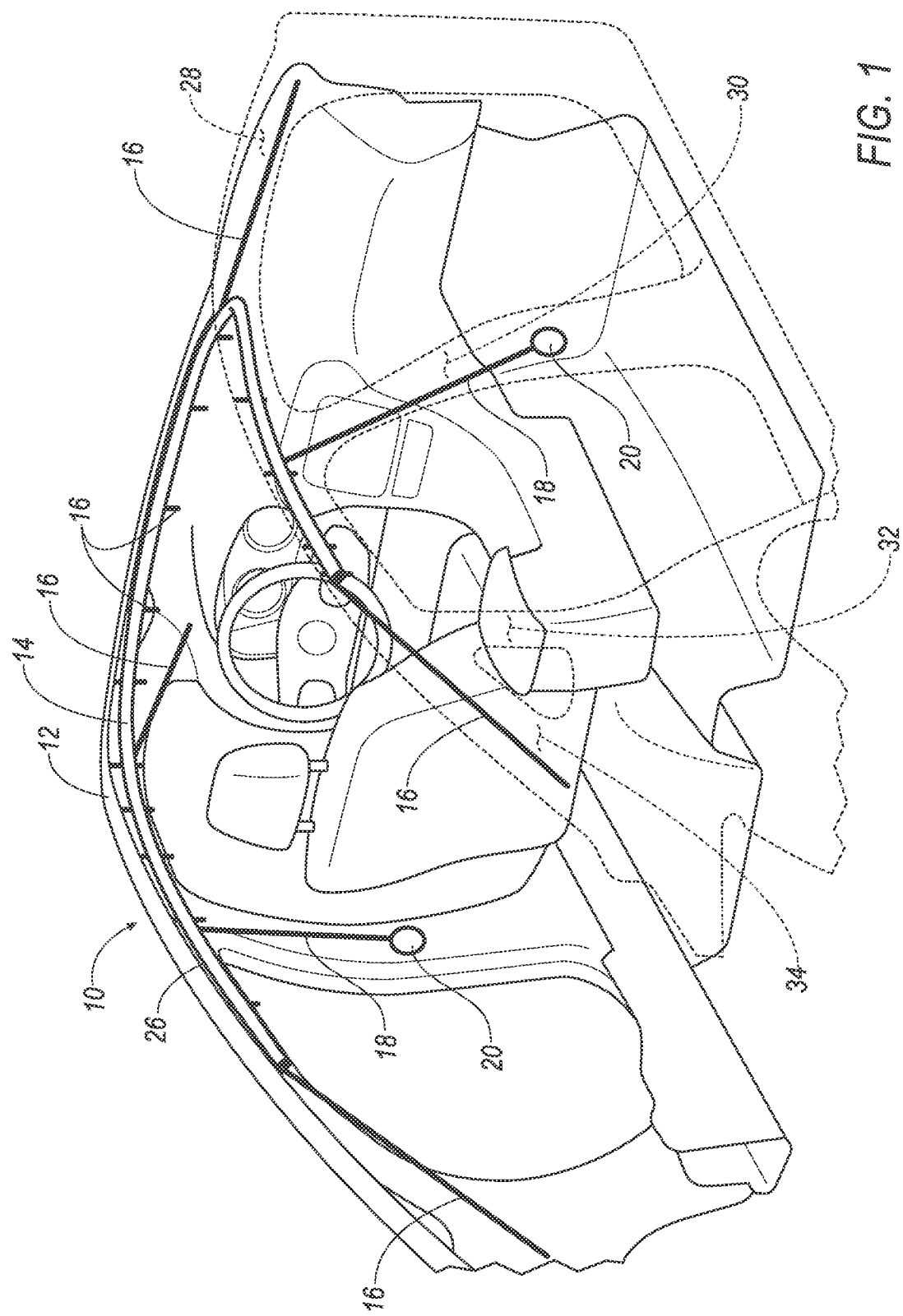
FIG. 1 is a perspective view of a vehicle curtain system in an undeployed state.
Figure 2:
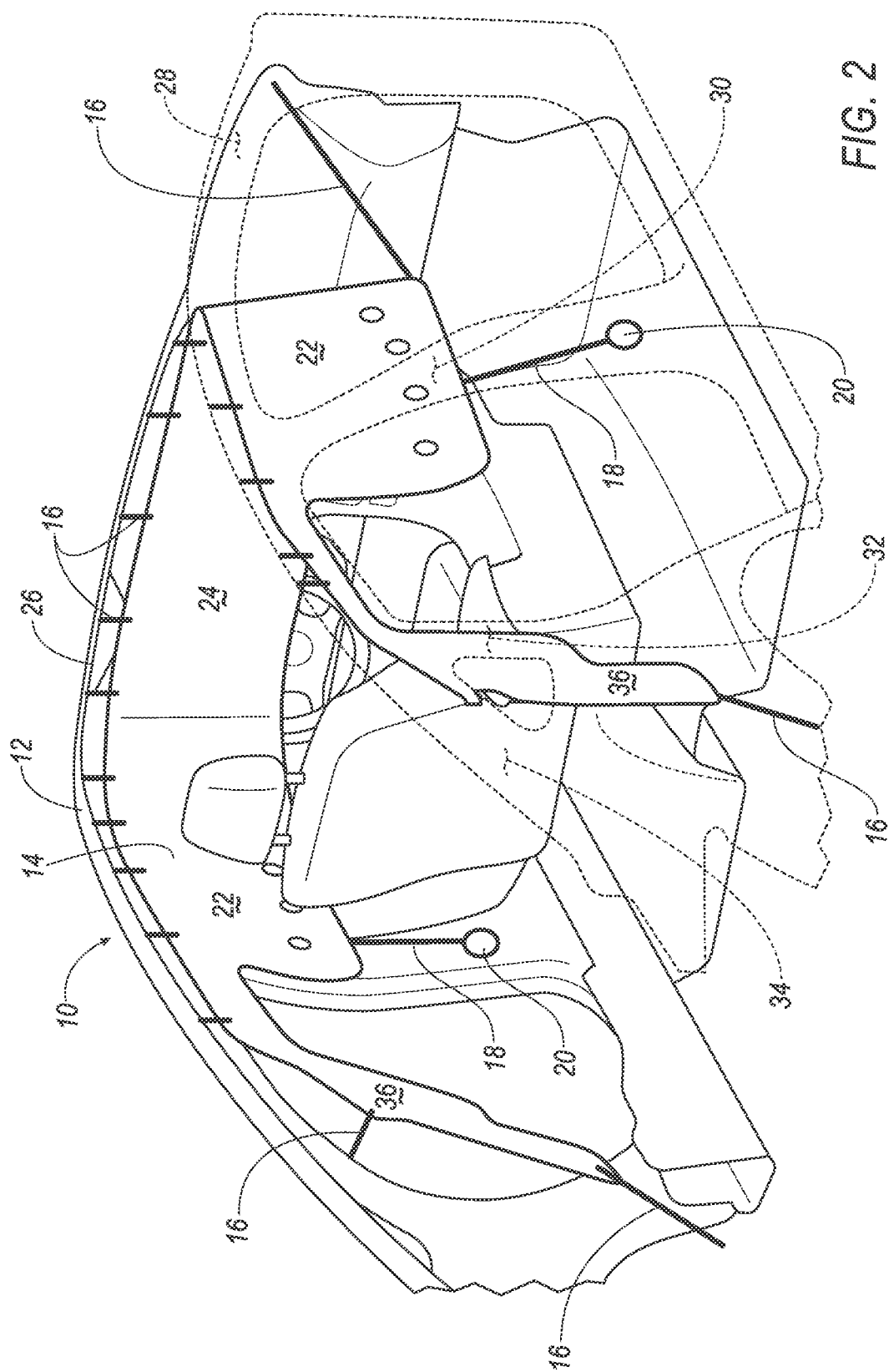
FIG. 2 is a perspective view of a vehicle curtain system in a deployed state.
Figure 3:
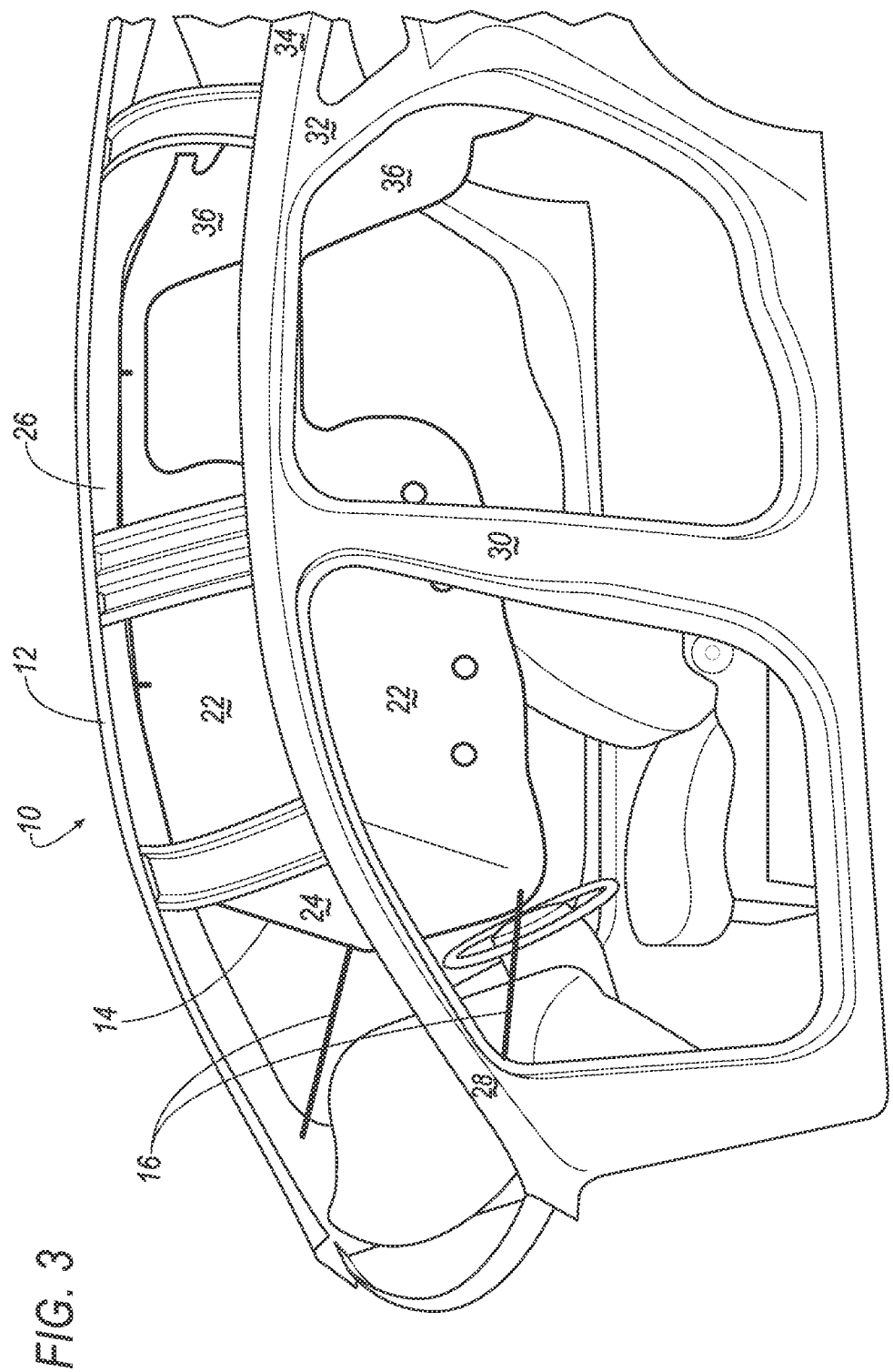
FIG. 3 is another perspective view of a vehicle curtain system in a deployed state.

As illustrated in FIGS. 1-3, disclosed herein is a vehicle curtain system 10 that may be installed on a vehicle body 12 to provide protection for one or more vehicle occupants, e.g., by restraining one or more occupants' heads and/or upper bodies in the event of a vehicle impact, e.g., an oblique impact. The vehicle curtain system 10 includes a curtain 14 that, in an undeployed state as shown in FIG. 1, may be rolled up and stored at or near a vehicle beltline 26, e.g., just below a roofline, in an interior of the vehicle body 12. In a deployed state, as shown in FIGS. 2 and 3, tethers 16, 18, each attached at a first end to the curtain 14, and at a second end to the vehicle body 12, maintain tension on the curtain 14. Accordingly, the curtain 14, including side walls 22 extending from a front panel 24, with a connecting belt 34 leading to rear pieces 36, protect an occupant's head and/or upper body from striking and/or going through a vehicle window, windshield, or similar opening, e.g., upon an oblique impact, rollover event, etc.

Passive tethers 16 are each attached to respective locations of the curtain 14 at a first end, and anchored to the vehicle body 12 at a second end. In general, the tethers 16 are sewn or otherwise affixed to, or near, an average of the curtain 14. Further, pretensioning tethers, sometimes referred to as active tethers or pretensioner cables, 18 are attached at respective locations of the curtain 14 at respective first ends of the pretensioning tethers 18, and to a pretensioner 20, which in turn is attached to the vehicle body 12, at respective second ends. For example, pretensioning tethers 18 are generally attached, e.g., sewn, at, or near, a bottom edge of the curtain 14. Alternatively or additionally, although not shown in the present figures, pretensioning tethers 18 could be attached at side or other substantially or approximately vertical edges of the curtain 14.

Figure 4:
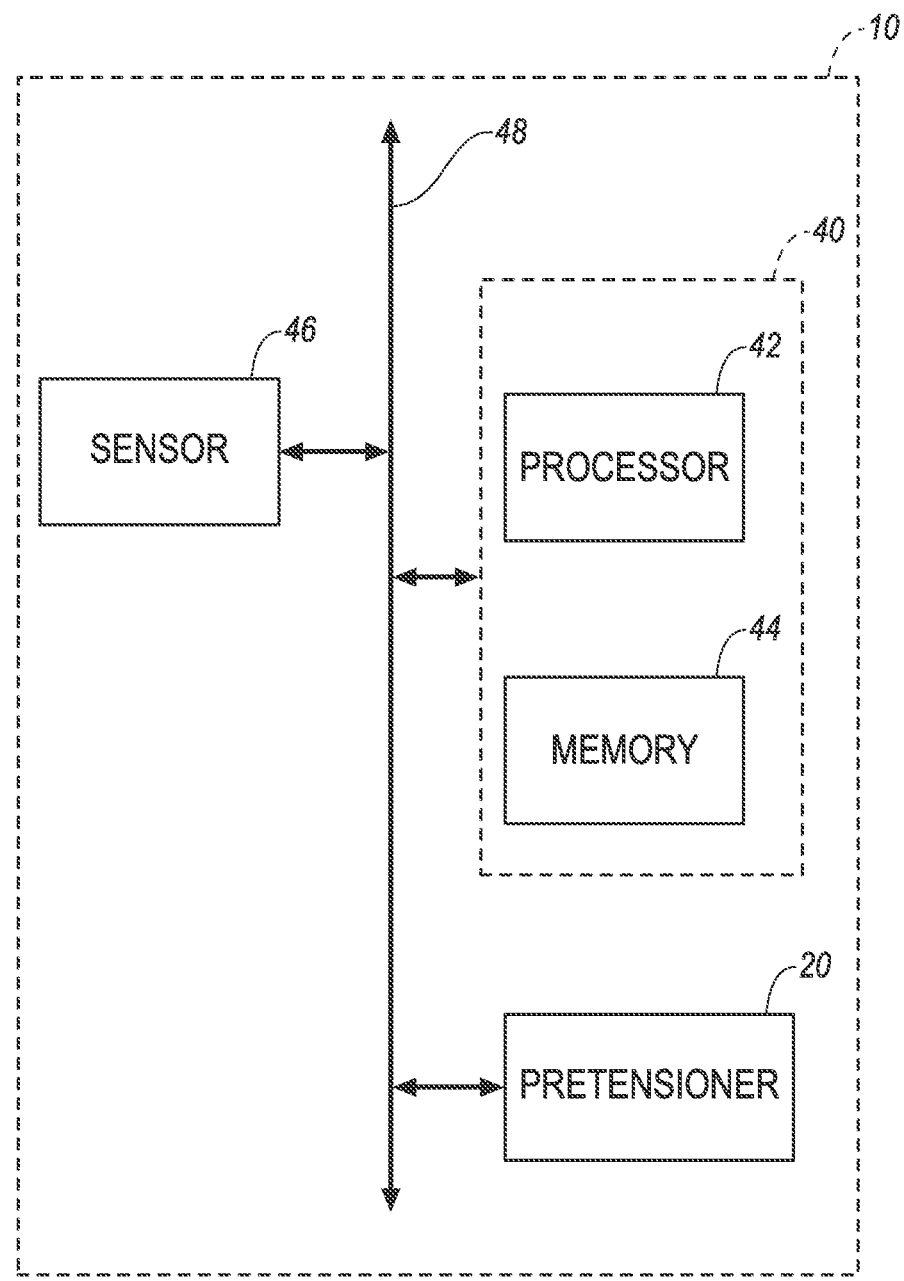
FIG. 4 is a block diagram of a vehicle curtain system including a controller, a sensor, and a pretensioner.

Accordingly, when an oblique impact is detected, the pretensioners 20, which may include known mechanisms such as a retractor tensioner or pyro-mechanical tensioner, or motorized electric pre-tensioner, etc., are triggered to cause a retraction of the pretensioning tethers 18, thus deploying the curtain 14, e.g., as seen in FIGS. 2 and 3. Further, upon deployment of the curtain 14, the passive tethers 16 are generally stretched to a taut condition. For example, a controller 40, as shown in FIG. 4, generally similar to an airbag controller could provide a signal to fire a pyro device to trigger a pyro-mechanical tensioner. The signal to fire the pyro device could be determined from a crash detection algorithm utilizing crash data measured from a vehicle based sensor 46, such as is known. Such controllers 40 are generally known as including a processor 42 and a memory 44, the memory 44 storing program instructions executable by the processor 42, e.g., here the controller 40 could include programming for determining when to provide instructions to trigger a pretensioner 20. Such instructions could be communicated via a Controller Area Network (CAN) bus 48 or similar communications mechanism in a vehicle.

Locations of the tethers 16, 18, and/or the pretensioners 20, may vary according to a type of vehicle body 12 in which the curtain system 10 is installed. In the example illustrated in the present figures, the vehicle body 12 includes an A-pillar 28, a B-pillar 30, a C-pillar 32, and a D-pillar 34. Passive tethers 16 are attached to each of the pillars 28, 32, and 34, as well as to various points along the beltline 26 of the vehicle body 12. However, in the illustrated example, no passive tether 16 is attached to the B-pillar 30, which instead is used to provide an anchor point for the pretensioner 20 which in turn secures an end of the active tether 18, another end of the active tether 18 being attached to the curtain 14.

As illustrated in FIGS. 2 and 3, when the curtain 14 is in a deployed state, the tethers 16, 18 maintain tension on the curtain 14 so that the panel 22, 24 surfaces are substantially flat and able to absorb an impact of, e.g., approximately 278 Joules. In general, the pretensioners 20 are configured to retract the active tethers 18, as mentioned above, to deploy the curtain 14, and also then serve to retain the tethers 18 in a retracted, i.e., deployed, state, thereby continuing to exert downward force to tension the curtain 14, e.g., respective side panels 22 as shown in the present illustrations.

Further with respect to the present illustrations, the passive tethers 16 do not generally expand or retract, i.e., maintain substantially a same length, regardless of whether the curtain 14 is in a deployed or undeployed state. However, some or all of the tethers 16 may be in a rolled or folded state, or otherwise include slack, when the curtain 14 is in an undeployed state. When the curtain 14 is deployed, the tethers 16 are generally extended to be taut, and to exert a pulling force on the curtain 14. Alternatively, one or more tethers 16 may be provided with some elasticity or flexibility, whereby the one or more tethers 16 may stretch or expand when the curtain 14 is deployed, but in any case, the tethers 16 are generally configured to exert a pulling force on the curtain 14 in a deployed state. The active tethers 18, in contrast to the tethers 16, are generally in a taut condition when the curtain 14 is in an undeployed state, the pretensioners 20 maintaining sufficient force on the tethers 18, e.g., substantially 2.5 kilo newtons, so as to keep the tethers 18 in a taut condition; in thereby maintaining tension in surfaces of the curtain 14 so that the curtain 14 remains in a deployed state.

As mentioned above, locations of tethers 16, 18, may vary according to a type of vehicle body 12 in which the system 10 is deployed. However, the tethers 16, 18 should generally be arranged so that surfaces of the curtain 14, e.g., the walls 22, 24, are substantially flat, i.e., as free from wrinkles as possible. Accordingly, to achieve desired flatness of surfaces of the curtain 14, with respect to tethers 16 attached to a vehicle body 12 beltline 26, i.e., an area above tops of vehicle body 12 door openings, the tethers 16 generally should be installed so that, when the curtain 14 is in the deployed state, these tethers 16 are substantially perpendicular to a top edge of the curtain 14 and also generally perpendicular to the vehicle body 12 beltline 26. Likewise, the pretensioners 20 generally should be installed on the vehicle body 12, e.g., pillars 30 as seen in the present illustration, so that the active tethers 18 are substantially perpendicular to a bottom edge of the curtain 14.

Numerous variations are within the scope and spirit of the present disclosure. For example, although two pretensioners 20 with respective active tethers 18 are shown in the figures, a larger number of pretensioners 20 and tethers 18 could be included in other implementations of the system 10, depending on a type of vehicle body 12. Further, although the present illustrations show the curtain 14 including a front wall 24 and two side walls 22 extending therefrom, but no wall or panel at a rear of the vehicle body 12, such further wall or panel could be included. Likewise, as can be seen in FIGS. 2 and 3, the side walls 22, together with the connecting belts 34 and the rear pieces 36, define an opening in the curtain 14 that generally coincides with a rear door opening in the vehicle body 12. However, implementations are possible in which the side wall 22 does not narrow to a width of the belt 34, but instead extends to the rear most edge of the curtain 14, i.e., to the rear piece 36, such that at least part of the rear door opening of the vehicle body 12 is covered by the curtain 14 when it is in a deployed state.

Advantageously, in contrast to a vehicle airbag or similar passive restraint mechanism, the curtain 14 is made of one or more fabric panels sewn together, e.g., of a polyester, nylon, etc. fabric currently known for use in a vehicle airbag; such fabric may also be used for the tethers 16; the tethers 18 generally include wire, cable, etc. The fabric panels may include a single ply or layer. Further advantageously, the curtain 14 does not require any inflation mechanism, and moreover can be manufactured without a sealant or the like such as would be used on a vehicle airbag. Yet further advantageously, the curtain 14, in a stowed state, e.g., as shown in FIG. 1, may be packaged to consume considerably less space than a vehicle airbag, for example, in the illustrated implementation, the curtain 14 may require an inch or less of vertical space when packaged in a stowed state, whereas a side-curtain airbag may require two inches of vertical space. Yet another advantage of not requiring multiple layers of fabric is that the curtain 14 is lighter and less expensive than passive safety devices such as airbags. Yet another advantage of the curtain system 10 is that tension in the curtain 14 may be maintained for a sustained period of time after a crash, in contrast to an airbag that may remain inflated for less than a second, and that may require multiple inflations when an impact is detected.

As used herein, the adverb "substantially" modifying an adjective means that a shape, structure, measurement, etc. may deviate from an exact described geometry, distance, measurement, etc., because of imperfections in materials, machining, manufacturing, etc.

In the drawings, the same reference numbers indicate the same elements. Further, some or all of these elements could be changed. Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their ordinary meaning as understood by those skilled in the art unless an explicit indication to the contrary is made herein. In particular, use of the singular articles such as "a," "the," "said," etc. should be read to recite one or more of the indicated elements unless a claim recites an explicit limitation to the contrary.

The invention claimed is:

1. A vehicle curtain system comprising:
   a curtain having at least a front wall and two side walls;
   one or more pretensioners, each having a corresponding pretensioner cable; and
   a plurality of tethers, each having a first end attached to the curtain and a second end arranged to be attachable to one of a vehicle roof and a vehicle pillar;
   wherein each pretensioner is configured to apply force to the corresponding pretensioner cable to deploy the curtain and the one or more pretensioners are a sole mechanism provided to apply force to deploy the curtain downward;
   wherein at least one of the second ends is attached to the vehicle roof and at least one of the second ends is attached to at least one of the vehicle pillars.

2. The curtain system of claim 1, wherein the pretensioner is one of a retractor tensioner or pyro mechanical tensioner.

3. The curtain system of claim 1, wherein each of the walls includes a single layer of fabric.

4. The curtain system of claim 1, wherein the tethers are made of fabric.

5. The curtain system of claim 1, wherein the curtain includes a fourth wall in addition to the front wall and the two side walls.

6. The curtain system of claim 1, wherein some but not all of the first ends of the tethers are attached to a top edge of the curtain.

7. The curtain system of claim 1, further comprising a controller programmed to provide an instruction to trigger the pretensioner when an oblique impact event is identified.

8. The curtain system of claim 1, wherein one of the second ends is attached to a first vehicle pillar and one of the second ends is attached to a second vehicle pillar.

9. The curtain system of claim 1, wherein the tethers are arranged to extend to exert a force on the curtain when the curtain is in a deployed state.

10. A vehicle curtain system comprising:
    a curtain having at least a front wall and two side walls;
    one or more pretensioners affixed to a vehicle body, each pretensioner having a corresponding pretensioner cable with a first end attached to the curtain and a second end attached to the pretensioner; and
    a plurality of tethers, each having a first end attached to the curtain and a second end arranged to be attachable to one of a vehicle roof and a vehicle pillar;

wherein each pretensioner is configured to apply force to the corresponding pretensioner cable to deploy the curtain and the one or more pretensioners are a sole mechanism provided to apply force to deploy the curtain downward;

wherein at least one of the second ends is attached to the vehicle roof and at least one of the second ends is attached to at least one of the vehicle pillars.

11. The curtain system of claim 10, wherein the at least one pretensioner is one of a retractor tensioner or pyro-mechanical tensioner.

12. The curtain system of claim 10, wherein the at least one pretensioner is attached to one of the vehicle pillars.

13. The curtain system of claim 10, wherein each of the walls includes a single layer of fabric.

14. The curtain system of claim 10, wherein the tethers are made of fabric.

15. The curtain system of claim 10, wherein the curtain includes a fourth wall in addition to the front wall and the two side walls.

16. The curtain system of claim 10, wherein the curtain is in a rolled or folded arrangement proximate to a roofline of the vehicle body when the curtain system is in an undeployed state.

17. The curtain system of claim 10, where each of the walls is substantially flat when the curtain system is in a deployed state.

18. The curtain system of claim 10, further comprising a controller programmed to provide an instruction to trigger the pretensioner when an oblique impact event is identified.

19. A vehicle curtain system comprising:
a curtain having at least a front wall and two side walls;
one or more pretensioners, each having a corresponding pretensioner cable;
a controller; and
a plurality of tethers, each having a first end attached to the curtain and a second end arranged to be attachable to one of a vehicle roof and a vehicle pillar;
wherein the controller is programmed to trigger each pretensioner to apply force to the corresponding pretensioner cable to deploy the curtain and the one or more pretensioners are a sole mechanism provided to apply force to deploy the curtain downward;
wherein at least one of the second ends is attached to the vehicle roof and at least one of the second ends is attached to at least one of the vehicle pillars.

* * * * *